United States Patent
Gardner et al.

(10) Patent No.: US 11,394,315 B2
(45) Date of Patent: Jul. 19, 2022

(54) PODL POWERED DEVICE WITH ACTIVE RECTIFIER BRIDGE TO OBVIATE THE NEED FOR DC-COUPLING INDUCTORS

(71) Applicant: Analog Devices International Unlimited Company, Limerick (IE)

(72) Inventors: Andrew J. Gardner, Santa Barbara, CA (US); Heath Stewart, Santa Barbara, CA (US); Gitesh Bhagwat, Santa Barbara, CA (US)

(73) Assignee: Analog Devices International Unlimited Company, Limerick (IE)

( * ) Notice: Subject to any disclaimer, the term of this patent is extended or adjusted under 35 U.S.C. 154(b) by 27 days.

(21) Appl. No.: 16/985,669

(22) Filed: Aug. 5, 2020

(65) Prior Publication Data
US 2021/0104953 A1 Apr. 8, 2021

Related U.S. Application Data

(60) Provisional application No. 62/911,664, filed on Oct. 7, 2019.

(51) Int. Cl.
*H02M 7/219* (2006.01)
*H02M 1/44* (2007.01)

(52) U.S. Cl.
CPC ............. *H02M 7/219* (2013.01); *H02M 1/44* (2013.01)

(58) Field of Classification Search
CPC ................................ H02M 7/219; H02M 1/44

USPC ........................................................ 363/127
See application file for complete search history.

(56) References Cited

U.S. PATENT DOCUMENTS

| | | | | |
|---|---|---|---|---|
| 2015/0145324 | A1* | 5/2015 | Heath | H04L 12/40045 307/1 |
| 2015/0295735 | A1* | 10/2015 | Gardner | G06F 13/4072 307/1 |
| 2016/0156173 | A1* | 6/2016 | Gardner | H02H 3/202 361/91.5 |
| 2017/0237574 | A1* | 8/2017 | Heath | H04L 12/40045 307/1 |
| 2017/0310491 | A1* | 10/2017 | Dwelley | H04L 12/40045 |

* cited by examiner

*Primary Examiner* — Yemane Mehari
(74) *Attorney, Agent, or Firm* — Schwegman Lundberg & Woessner, P.A.

(57) ABSTRACT

A Power over Data Lines (PoDL) system provides a DC voltage and differential data signals on the same wire pair. A Powered Device (PD) load is coupled to the wire pair, via a gyrator, for being powered by the DC voltage. The gyrator emulates the DC-coupling properties of inductors using active components. The gyrator includes transistors that are controlled to act as a full-bridge rectifier for ensuring a correct polarity DC voltage is applied to the PD load. Since the transistors operate in saturation and are coupled to be insensitive to differential data signals on the wire pair, the current supplied to the PD load is substantially unaffected by the differential data signals. Negative feedback circuits in the gyrator reduce fluctuations in current through the gyrator due to differential data signals on the wire pair. No inductors are required in the gyrator. A PHY is AC-coupled to the wire pair via capacitors.

18 Claims, 12 Drawing Sheets

PODL POWERED DEVICE WITH ACTIVE RECTIFIER BRIDGE TO OBVIATE THE NEED FOR DC-COUPLING INDUCTORS

CROSS-REFERENCE TO RELATED APPLICATIONS

This application is based on and claims priority from U.S. Provisional Application Ser. No. 62/911,664, filed Oct. 7, 2019, by Andrew J. Gardner et al., incorporated herein by reference.

FIELD OF THE INVENTION

The invention relates to single-wire-pair, Power over Data Lines (PoDL) systems, where DC power and differential data signals are provided over the same twisted wire pair, and, in particular, to techniques to DC-couple a Powered Device (PD) to the wire pair without the need for inductors, while also performing DC polarity correction using an active full-bridge rectifier.

BACKGROUND

It is known to transmit DC power over differential data lines to power remote equipment. Power over Data Lines (PoDL) is an example of one such system. In PoDL, limited power is transmitted over a single, twisted wire pair along with the differential data. Certain standards for PoDL are found in IEEE P802.3bu and IEEE P802.3cg.

The DC voltage does not affect the differential data due to the use of DC coupling/decoupling circuits and AC coupling/decoupling circuits. In this way, the need for providing any external power source for the Powered Devices (PDs) can be eliminated. The PD load, powered by the DC power, may be a sensor, video camera, etc. A separate PHY (a transceiver) in the PD is AC-coupled to the wire pair and may communicate with a PHY in the Power Source Equipment (PSE) via differential data signals. The PHY is the physical layer of the OSI network model and may include receivers, transmitters, amplifiers, decoders, and other well-known devices which transmit and receive the differential signals on the wires and generate signals for further processing. The requirements for such PHYs are specified in the IEEE standards.

FIG. 1 is an example of one type of conventional PoDL system to which the present invention will be compared.

A twisted wire pair 10 is coupled between the PSE 12 and one or more PDs 14, 15. The PSE 12 provides a DC voltage across the wires in the wire pair 10. The PDs 14, 15 are insensitive to the polarity of the DC voltage since they include a full-bridge rectifier. The PDs 14, 15 include at least a PD load and a PD controller, where the PD controller communicates with the PSE 12 during start-up and controls a switch to connect the full DC voltage on the wires to the PD load.

The ends of the wire pair 10 are terminated by RC circuits comprising resistor R1 and capacitor C1, and resistor R2 and capacitor C2. Termination circuits reduce signal reflections.

The PSE 12 includes a DC voltage source and processing circuitry for determining whether the PDs 14, 15 are PoDL-compatible and for determining the power requirements of the PDs 14, 15. Prior to the PSE 12 closing a switch to couple the full DC voltage (e.g., 54 V) across the wires, the PSE 12 and the PDs 14, 15 perform a low-power handshaking routine that does not involve the PHYs 18-20. The signals during the handshaking mode are DC or low frequency, so are passed by the DC-coupling inductors L1-L6.

When the PSE 12 closes the switch, the inductors L1-L6 pass the DC voltage to power the PD loads and present a high impedance to the AC differential signals. The PHYs 18-20 are coupled to the wires via AC-coupling capacitors C3-C8, which pass the differential signals and block the DC voltage.

FIG. 2 illustrates an example of a PD 20 coupled to the wire pair 10. Inductors L7 and L8 DC-couple the PD 20 to the wire pair 10 via a passive full-bridge rectifier 22, comprising diodes D1-D4. The PHY 24 is AC-coupled to the wire pair 10 using capacitors C9 and C10.

The circuits of FIGS. 1 and 2 perform adequately. The AC-coupling capacitors C3-C10 may be very small (e.g., <100 nF) and inexpensive. However, the inductors L1-L8 are relatively large and expensive.

If the PoDL system is a multi-drop system, with multiple PDs coupled to the same wire pair at different locations, the overall cost of the inductors is even more significant.

What is needed is a lower cost solution for providing polarity insensitive DC-coupling to a PD in a PoDL system, where inductors (which couple the full DC power to the PD) are not required.

SUMMARY

A PD for a PoDL system is disclosed where the PD contains a gyrator that provides DC voltage polarity correction, DC-couples the DC voltage to the PD load, presents a high impedance to the differential data, and does not require an inductor for DC-coupling.

Transistors are used in a first portion of a full-bridge rectifier, along with capacitors, to couple a positive DC voltage to the positive voltage terminal of the PD load while effectively blocking AC signals from being coupled to the positive voltage terminal of the PD load. Similarly, transistors are used in a second portion of the full-bridge rectifier, along with capacitors, to couple a negative DC voltage to the negative voltage terminal of the PD load while effectively blocking AC signals from being coupled to the negative voltage terminal of the PD load. The rectifier couples the proper polarity DC voltage to the PD load without the need for inductors. The capacitors used in the rectifier are significantly smaller and less expensive than inductors.

In one embodiment, each of the two portions of the full-bridge rectifier uses at least four transistors, which may be MOSFETs or bipolar transistors, or a combination of both. In another embodiment, transistors and diodes are used in each portion of the full-bridge rectifier.

In embodiments using all MOSFET transistors in the full-bridge rectifier, the drains of some MOSFETs are coupled to the wires. Since these MOSFETs operate in saturation, the variations in the AC data signals on the wires do not significantly affect the conductivity of the MOSFETs and the voltage applied to the positive voltage terminal of the PD load. Similarly, when using bipolar transistors, the collectors of some of the transistors are coupled to the wires, so the variations in the AC data signals on the wires do not significantly affect the voltage applied to the PD load.

Further, the data signals vary the gate and source voltages (or the base and emitter voltages) similarly, so do not have a significant effect on the conductivity of the transistors.

The full-bridge rectifier is self-controlled by the polarity of the DC voltage.

Thus, the full-bridge rectifier emulates relatively large value DC-coupling inductors by conducting DC voltages and blocking AC data signals. In this respect, the rectifier is a gyrator since it emulates inductors using capacitive effects and transistors.

In one embodiment, there are multiple PDs using the same wire pair, so the benefits of not requiring inductors are increased. This is referred to as a multi-drop system.

Other embodiments are described.

BRIEF DESCRIPTION OF THE DRAWINGS

Elements that are the same or equivalent in the various figures are labelled with the same numerals.

DETAILED DESCRIPTION OF THE EMBODIMENTS

Figure 1:
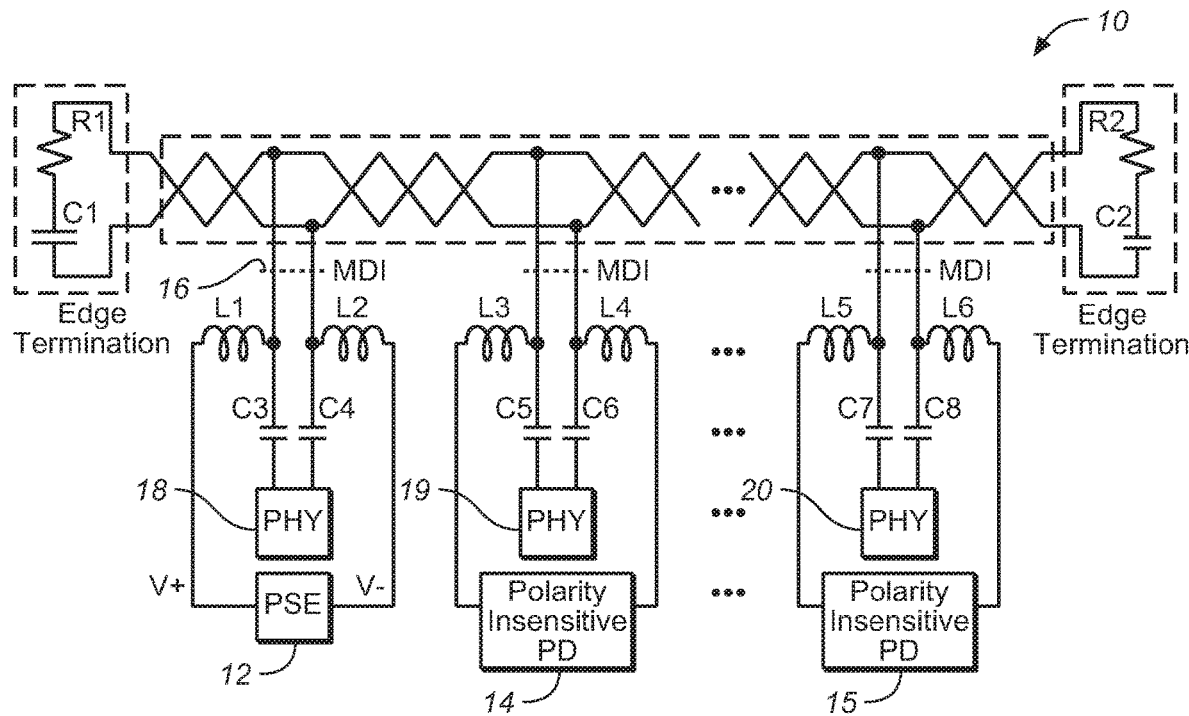
FIG. 1 illustrates a prior art PoDL, multi-drop system.
Figure 2:
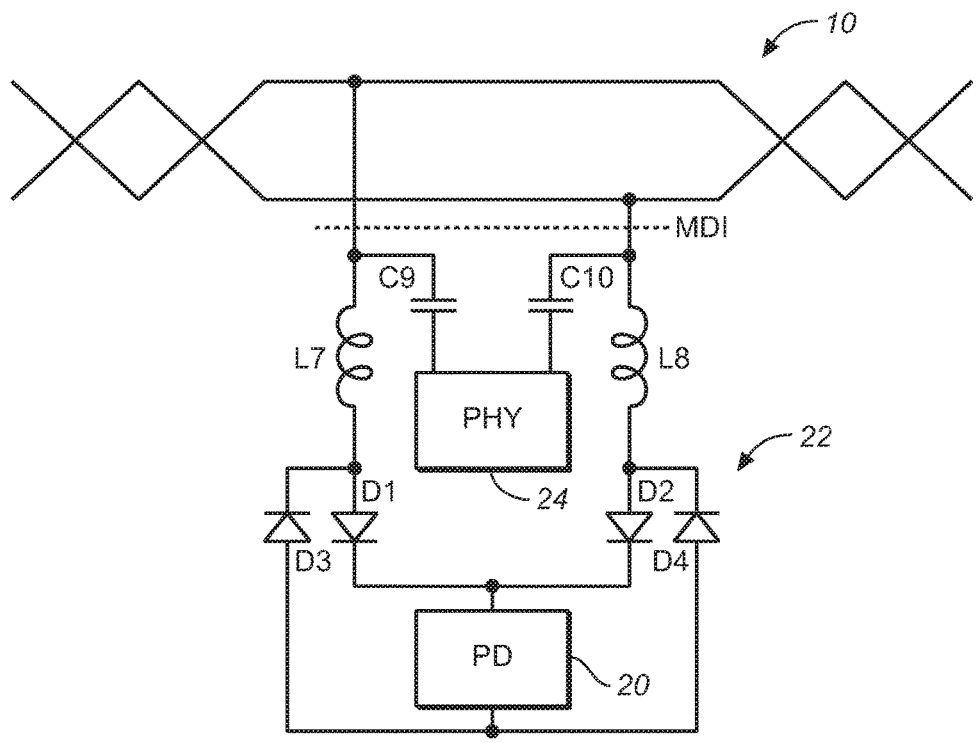
FIG. 2 illustrates an example of a PD node using DC-coupling inductors and a passive full-bridge rectifier for rectifying DC voltage on the wire pair.
Figure 3:
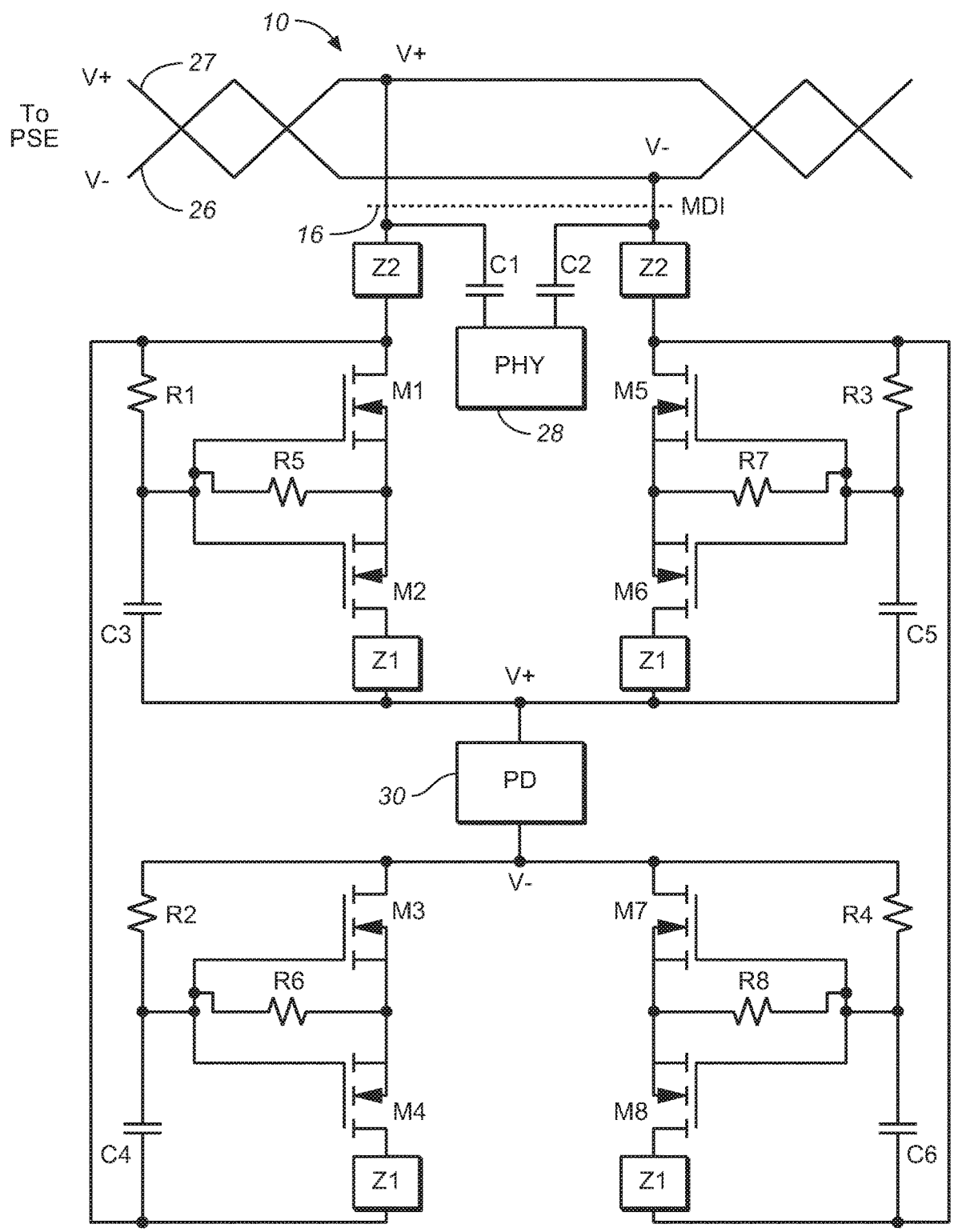
FIG. 3 illustrates one embodiment of the invention, where the DC-coupling inductors are replaced with a gyrator that effectively blocks AC data signals, rectifies the DC voltage, and passes the DC voltage to the PD load.

FIG. 3 illustrates one embodiment of the invention. Only one PD node is shown coupled to wires 26 and 27 of a twisted wire pair 10 via a conventional MDI 16. A PSE is not shown since it may be conventional, such as the PSE of FIG. 1. The PSE applies a DC voltage (e.g., 44 V) across the wires 26 and 27. During normal operation of the PoDL system, a conventional DC voltage source in the PSE has its positive power supply terminal coupled to one of the wires 26 or 27 and its negative power supply terminal (relative to the positive voltage) coupled to the other one of the wires 26 or 27. There may be multiple PD nodes coupled to the same wire pair 10, and each PD load is powered by the same PSE. The PD loads may include voltage regulators that convert the DC voltage across the wires 26 and 27 to the appropriate voltage for the PD load.

The PD nodes may include conventional PHYs 28 to communicate with other PHYs via the wires 26 and 27 using Ethernet differential data signals.

The present invention is primarily directed to the DC voltage coupling to the PD load 30. Requirements of the DC coupling circuit are that it rectifies the DC voltage, filters out the AC data signals so as not to add any significant loading to the data path, and applies the rectified DC voltage to the PD load 30. The PD load 30 includes all elements that require power to operate, such as a camera, processing circuits, etc. Although not shown in FIG. 3, a regulated DC voltage is also applied to the PHY 28 for operating the PHY 28. The PD load 30 and PHY 28 may be conventional.

No inductors are required in the PD nodes since the DC-coupling is performed by gyrators.

The AC-coupling capacitors C1 and C2 couple the differential data signals to the PHY 28 and block the DC voltage.

It is assumed that the top terminal of the PD load 30 is a positive voltage input terminal, and the bottom terminal of the PD load 30 is a negative voltage input terminal.

Assuming that the PSE DC voltage source supplies a positive voltage V+ to the wire 27 and a negative voltage V− to the wire 26, the positive voltage is applied to the drain of the MOSFET M1 via the impedance Z2. It will be assumed that the impedance Z2 is a resistor or a short circuit. The positive voltage is also applied to the drain of the MOSFET M4 via impedances Z2 and Z1. It will be assumed that the impedance Z1 is a resistor or a short circuit.

The MOSFETs M1-M8 are N-channel types and have their sources connected to their bodies.

The body diode in the MOSFET M1 is reverse biased, and the body diode in the MOSFET M2 is forward biased. Therefore, current flows through the resistors R1 and R5 between the wire 27 and the PD load 30, causing there to be voltage drops across the resistors R1 and R5. At the same time, the capacitor C3 is charged to the voltage differential between the top terminal of the PD load 30 and the voltage at the common node of resistors R1 and R5.

The resistors R1 and R5 are selected so that the voltage drop across the resistor R5 exceeds the threshold voltage of the MOSFETs M1 and M2. The resistors R1 and R5 may have equal values, so each drops the gate-source voltage Vgs. The Vgs of the MOSFETs M1 and M2 is the same. Both MOSFETs M1 and M2 thus conduct to apply the V+ voltage to the top terminal of the PD load 30. The optimal values of the resistors R1 and R5 can be easily determined by simulation.

The MOSFET M1 operates in its saturation mode, where the current is fairly independent of its drain-source voltage. The MOSFET M2, on the other hand, operates in the triode region, where the drain-source voltage is very low and the MOSFET behaves like a voltage dependent resistor.

The capacitor C3 blocks the DC voltage and smooths out voltage ripples.

Accordingly, when a positive DC voltage is applied to the wire 27, both MOSFETs M1 and M2 are on to couple the positive voltage to the top terminal of the PD load 30 with a typical voltage drop of 2V to 3V.

A data signal on the wire 27 is effectively filtered out by the MOSFET M1. Since the MOSFET M1 operates in its saturation mode, its drain voltage is relatively independent of its current. Any small variations in voltage due to the data signals at the drain of the MOSFET M1 do not change the current, so there is insignificant effect on the data signals and on the input to the PD load 30.

The resistor R1 attenuates the data signal, and the capacitor C3 smooths the voltage across the MOSFET M2 so there is insignificant ripple in the DC voltage applied to the top terminal of the PD load 30 as a result of the differential data signals.

Further, any AC current flowing into the capacitor C3 has little effect on the current through the MOSFETs M1 and M2 due to the gate voltage changing along with the source voltage, since the resistor R5 is connected between the source and gate of the MOSFETs M1 and M2.

The MOSFETs M5 and M6 on the right side of FIG. 3 are off since the negative voltage (V−) on the wire 26 causes the Vgs of the N-channel MOSFETs M5 and M6 to be negative. The capacitor C5 blocks the DC voltage.

Regarding the negative voltage on the wire 26, an initial current flows through the PD load 30, which causes the capacitor C6 to charge so the drain of the MOSFET M7 is more positive than its source. The body diode of the MOSFET M8 is forward biased. The voltage drops across the resistors R4 and R8 create a Vgs that is higher than the threshold voltages of the MOSFETs M7 and M8 to turn them on to cause the negative voltage V− to be applied to the bottom terminal of the PD load 30 with a typical voltage drop of 2V to 3V.

Any data signal on the wire 26 does not affect the current through the MOSFETs M7 and M8 since the gate-source voltage (Vgs) does not change. MOSFET M7 operates in saturation, while the MOSFET M8 operates in its triode region. Slight voltage variations at the drain of the MOSFET M7 do not affect its current. The capacitor C6 smooths out ripples, and there is negative feedback which further reduces ripples.

On the bottom left side of the FIG. 3, the MOSFETs M3 and M4 are off since there is a negative Vgs.

In one embodiment, the gyrator of FIG. 3 emulates DC-coupling inductors having a value on the order of millihenries. The design of FIG. 3, using a short for the impedances Z1 and Z2, may be satisfactory for data rates up to about 100 Mbps. For Gigabit Ethernet, the AC filtering of the gyrator may not be large enough to adequately filter out the high frequency AC signals. So, the impedances Z1 and Z2 may be small value inductors, which would be on the order of 1/1000 the value of conventional inductors used in a PoDL system. Depending on the PoDL requirements for data speeds, the impedances Z1 and Z2 can be a small inductor, a small inductor in parallel with a resistor, a ferrite bead (presenting a small value inductance), or a short circuit. A wide range of data speeds may therefore be used with the same circuit.

If the DC voltage polarity was reversed, MOSFETs M5 and M6, the resistors R3 and R7, and the capacitor C5 would operate to couple the positive voltage on the wire 26 to the top terminal of the PD load 30. Similarly, the MOSFETs M3 and M4, the resistors R2 and R6, and the capacitor C4 would operate to couple the negative voltage on the wire 27 to the bottom terminal of the PD load 30.

Figure 4:
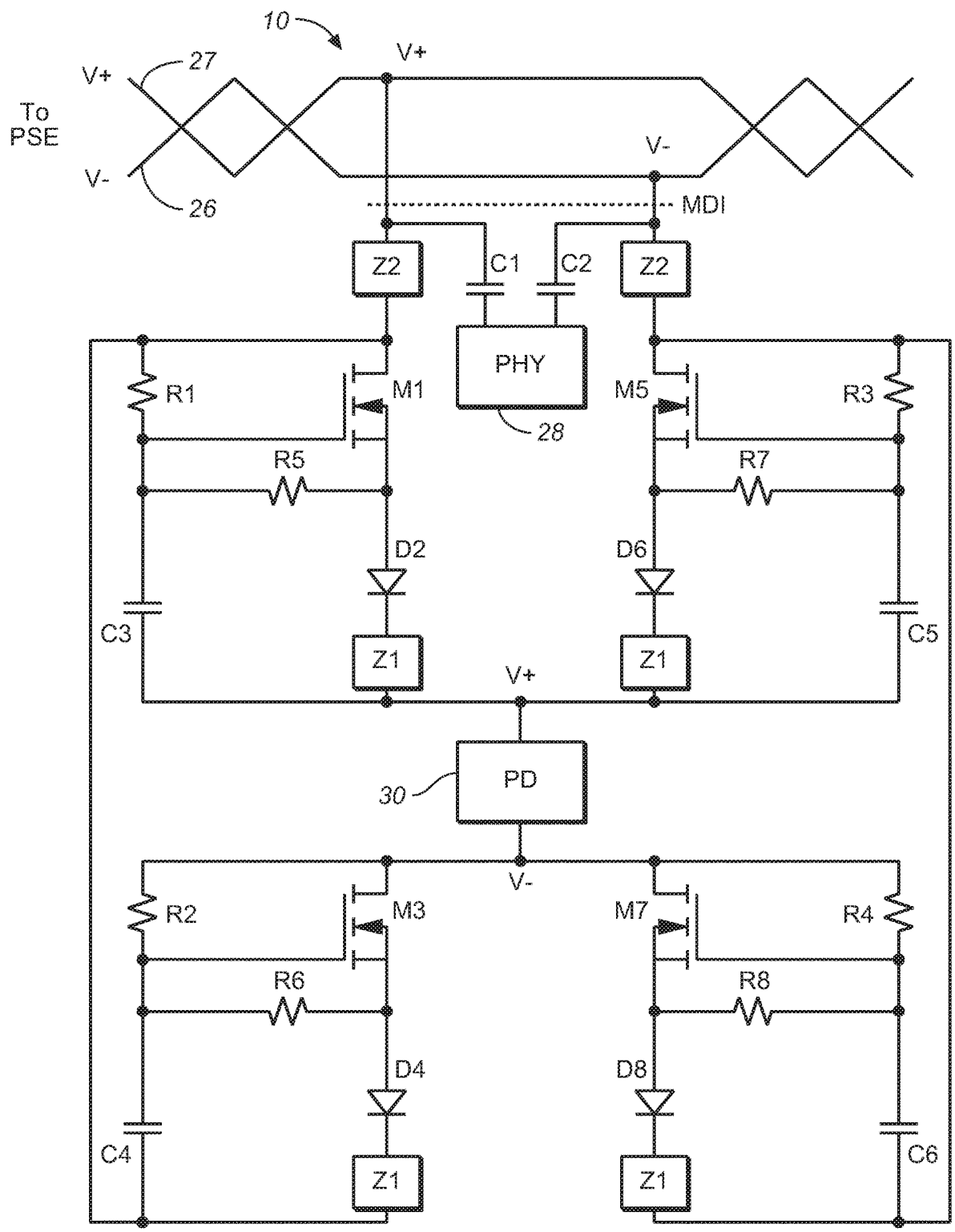
FIG. 4 illustrates how four of the MOSFETs in the full-bridge rectifier of FIG. 3 can be replaced with diodes.

FIG. 4 illustrates how the MOSFETs M2, M4, M6, and M8 in the full-bridge rectifier of FIG. 3 can be replaced with diodes D2, D4, D6, and D8, respectively. These replace the body diodes of the MOSFETs M2, M4, M6, and M8, so there is no benefit of the reduced voltage drops of the MOSFETs M2, M4, M6, and M8. Negative feedback and the saturation states of the MOSFETs cause the DC-coupling of the gyrator to not be significantly affected by the differential data signals.

Figure 5:
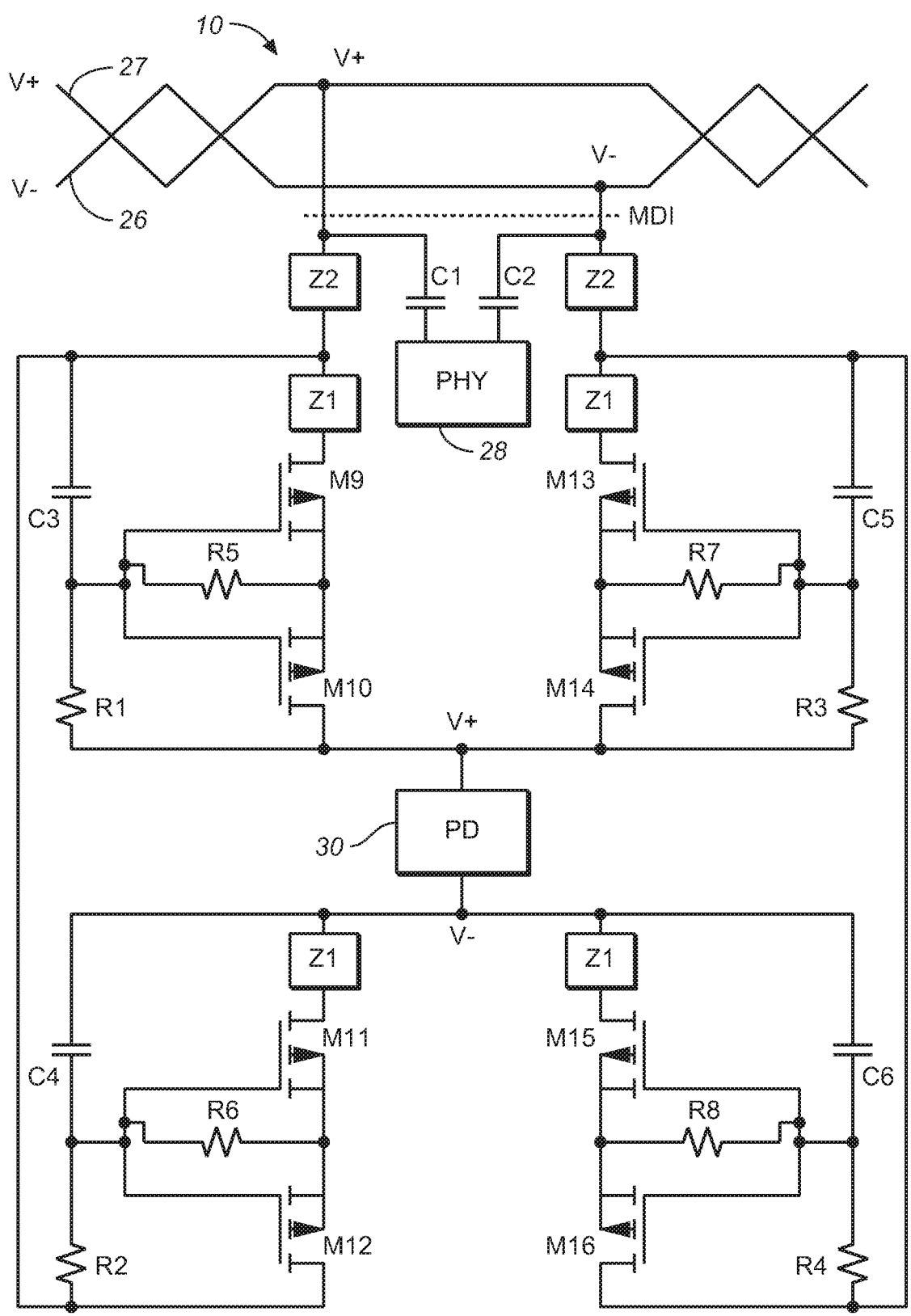
FIG. 5 illustrates how the N-channel MOSFETs of FIG. 3 can be replaced with P-channel MOSFETs.

FIG. 5 illustrates how the N-channel MOSFETs of FIG. 3 can be replaced with P-channel MOSFETs, while the locations of the capacitors C3-C6 and resistors R1-R4 are reversed. The general operation is the same as the operation of the circuit of FIG. 3 except that, when a positive DC voltage is applied to the wire 27 and a negative DC voltage is applied to the wire 26, a negative Vgs is generated for MOSFETs M9 and M10 to turn them on to apply the positive voltage V+ to the top terminal of the PD load 30. The body diode of the MOSFET M9 initially conducts to cause a current to flow through the resistors R5 and R1 to generate the initial Vgs voltage to turn the MOSFETs M9 and M10 on. Similarly, a negative Vgs is applied to the MOSFETs M15 and M16 to turn them on to apply the negative voltage V− to the bottom terminal of the PD load 30. The other MOSFETs M11-M14 are off. The AC filtering is similar to that for FIG. 3.

Figure 6:
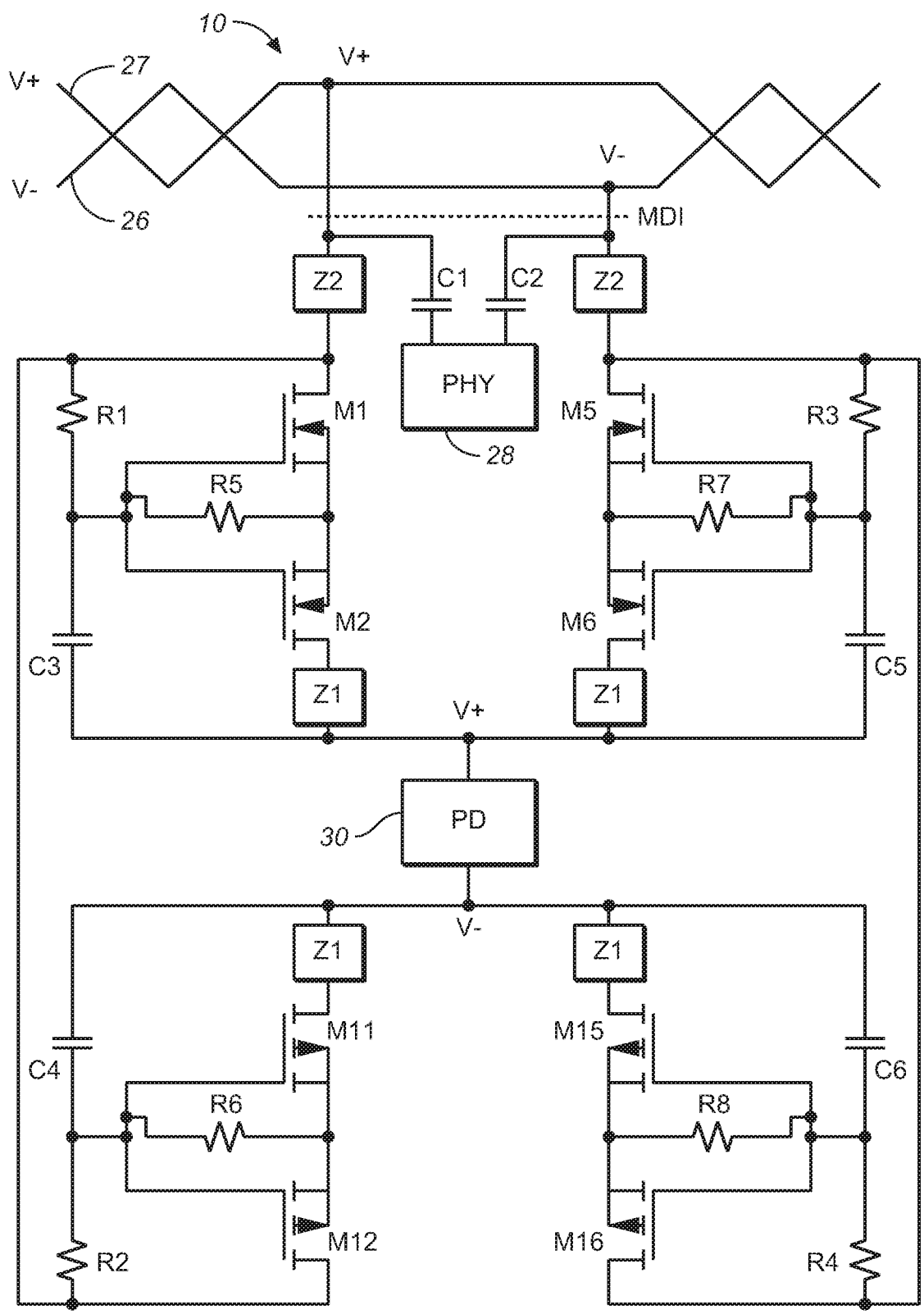
FIG. 6 illustrates how one full-bridge rectifier portion uses N-channel MOSFETs while the other full-bridge rectifier portion uses P-channel MOSFETs.

FIG. 6 illustrates how the top full-bridge rectifier portion uses N-channel MOSFETs while the bottom full-bridge rectifier portion uses P-channel MOSFETs. The operation of the top part of FIG. 6 is the same as that in FIG. 3. The operation of the bottom part of FIG. 6 is the same as that in FIG. 5.

Figure 7:
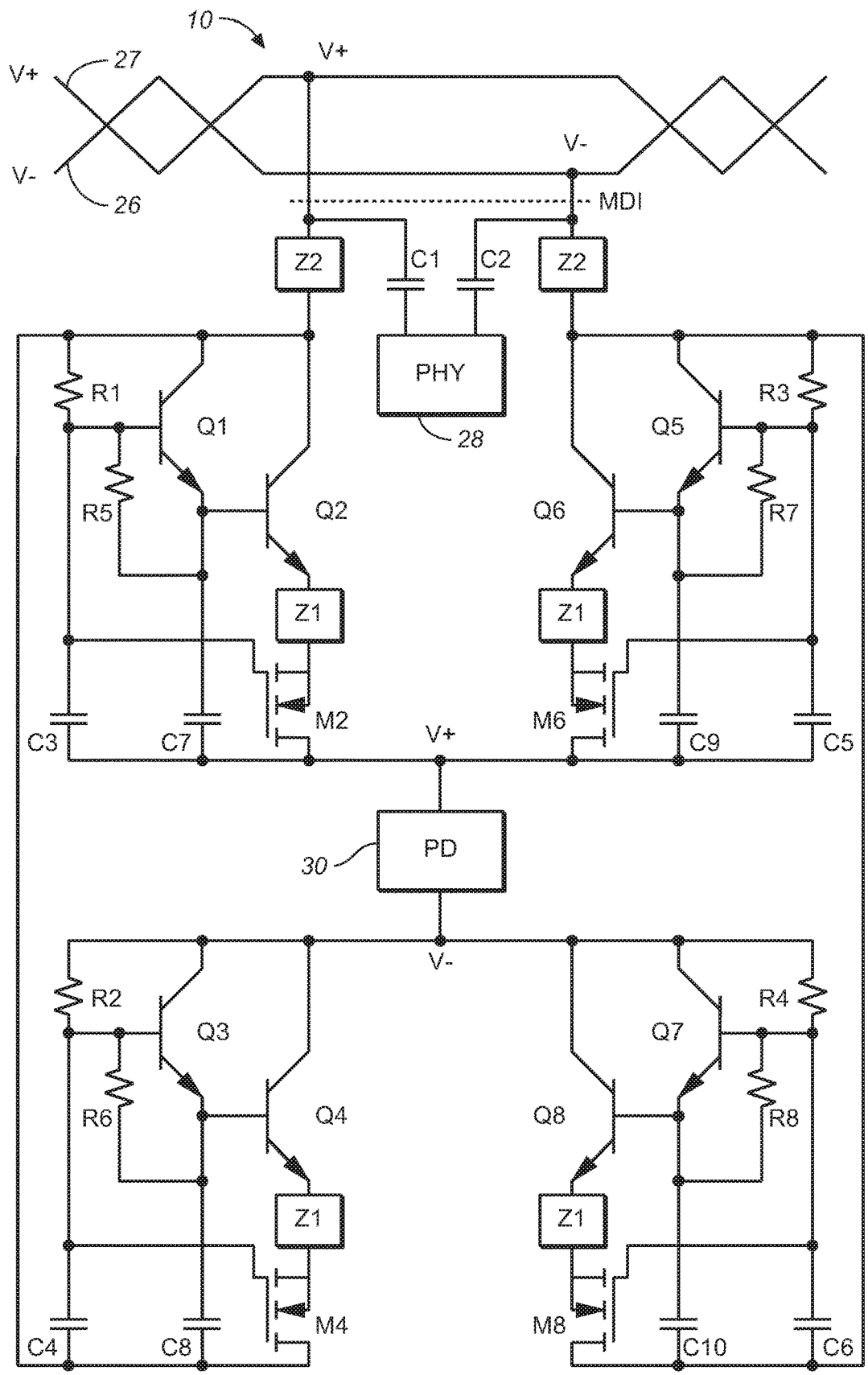
FIG. 7 illustrates how the full-bridge rectifier uses a combination of NPN bipolar transistors and MOSFETs.

FIG. 7 illustrates how the full-bridge rectifier uses a combination of NPN bipolar transistors and N-channel MOSFETs. When a positive DC voltage is applied to the wire 27 and a negative DC voltage is applied to the wire 26, the base-emitter of the transistor Q1 is forward biased to turn on the transistors Q1 and Q2, connected in a Darlington configuration. The Vgs of the MOSFET M2 is sufficiently positive, which turns on the MOSFET M2 to create a current path between the wire 27 and the top terminal of the PD load 30. Similarly, the transistors Q7 and Q8 are turned on by the negative voltage on the wire 26, along with the MOSFET M8, to create a current path between the wire 26 and the bottom terminal of the PD load 30. The remaining transistors Q5, Q6, M6, Q3, Q4, and M4 are off when the DC polarity is as shown. The AC data signals on the wires 26 and 27 are effectively filtered out due to the AC signals having an insignificant effect on the current conducted, since slight changes in collector voltages and drain voltages, due to the AC data signals, have an insignificant effect on the current conducted by the various transistors. Also, negative feedback cancels out the AC effects.

Figure 8:
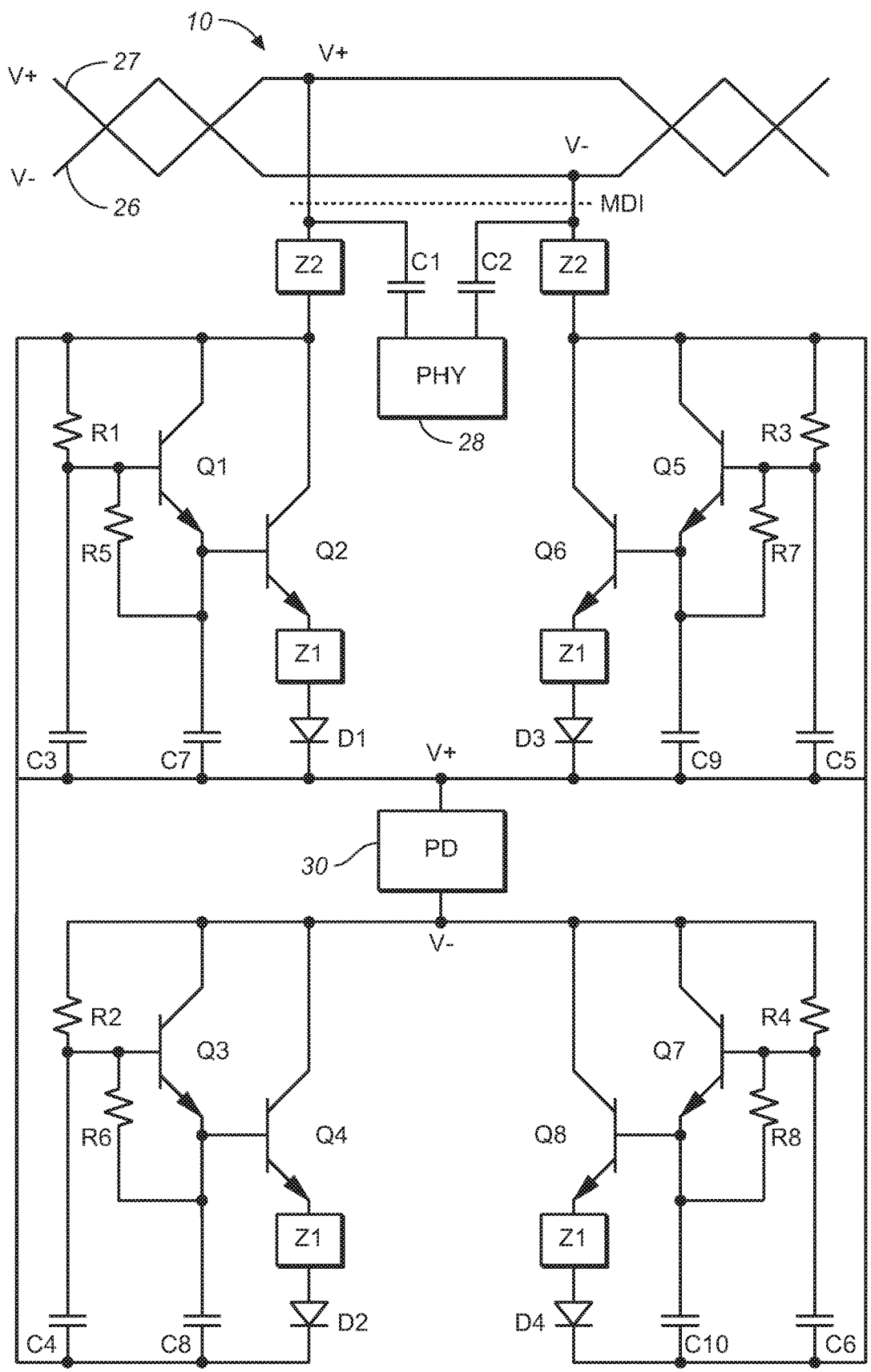
FIG. 8 illustrates how the full-bridge rectifier uses a combination of NPN bipolar transistors and diodes.

FIG. 8 illustrates how the full-bridge rectifier uses a combination of NPN bipolar transistors and diodes. The operation is the same as in FIG. 7. The diodes D1, D2, D3, and D4 have the same orientations as the body diodes in the MOSFETs M2, M4, M6, and M8 in FIG. 7. The diodes have a higher voltage drop than the MOSFETs when the MOSFETs are turned on.

Figure 9:
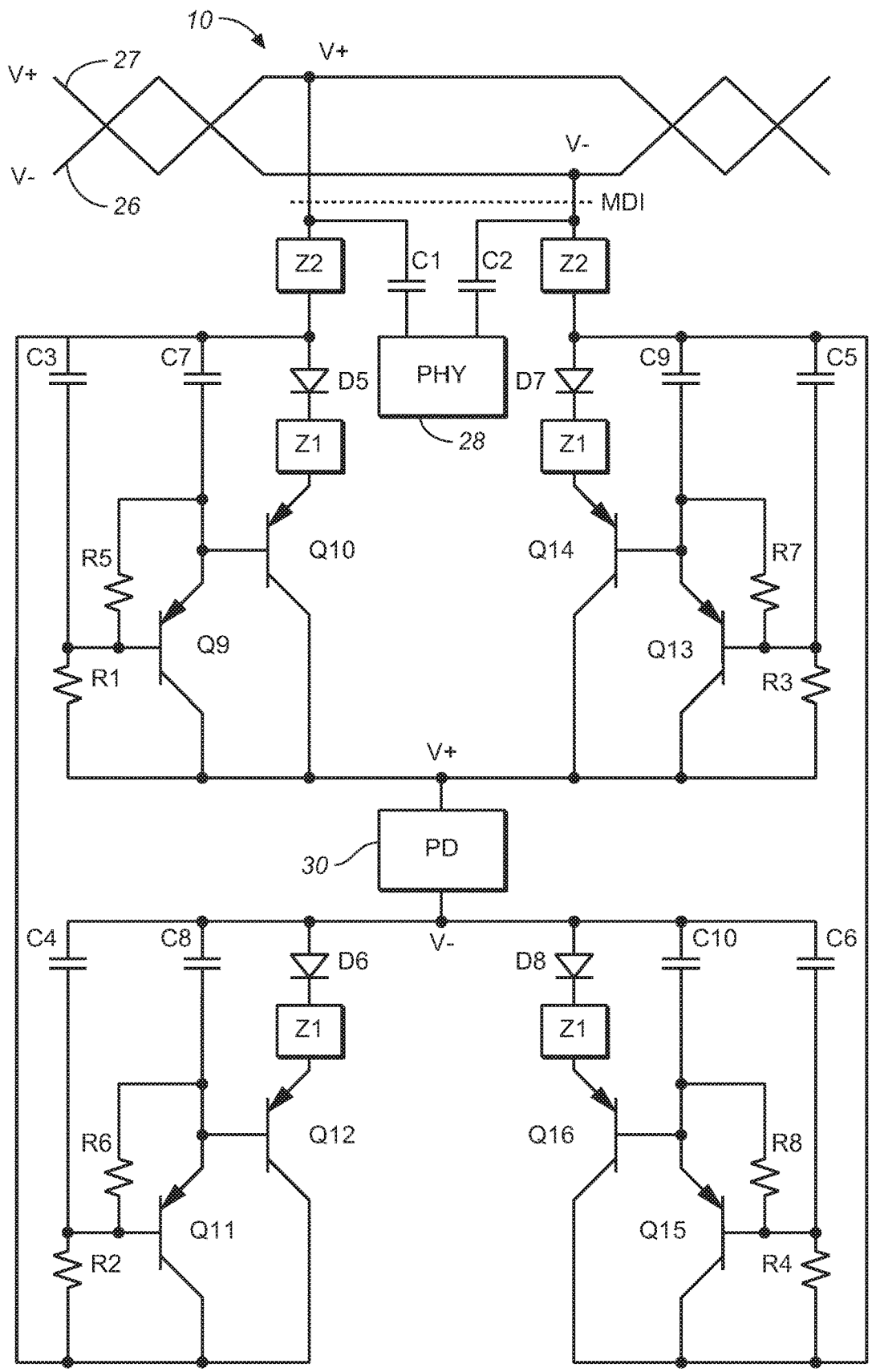
FIG. 9 illustrates how the full-bridge rectifier uses a combination of PNP bipolar transistors and diodes.

FIG. 9 illustrates how the full-bridge rectifier uses a combination of PNP bipolar transistors and diodes. With the voltage polarity shown, the base-emitter of the transistor Q9 is forward biased to turn on the transistors Q9 and Q10, connected in a Darlington configuration. The diode D5 is forward biased to create a current path between the wire 27 and the top terminal of the PD load 30. Similarly, the transistors Q15 and Q16 are turned on by the negative voltage on the wire 26, and the diode D8 is forward biased, to create a current path between the wire 26 and the bottom terminal of the PD load 30. The remaining transistors and diodes Q13, Q14, D7, Q11, Q12, and D6 are off when the DC polarity is as shown. The AC data signals on the wires 26 and 27 are effectively filtered out due to the AC signals having an insignificant effect on the current conducted, since slight changes in collector voltages, due to the AC data signals, have an insignificant effect on the current conducted by the various transistors. Also, negative feedback cancels out the AC effects.

Figure 10:
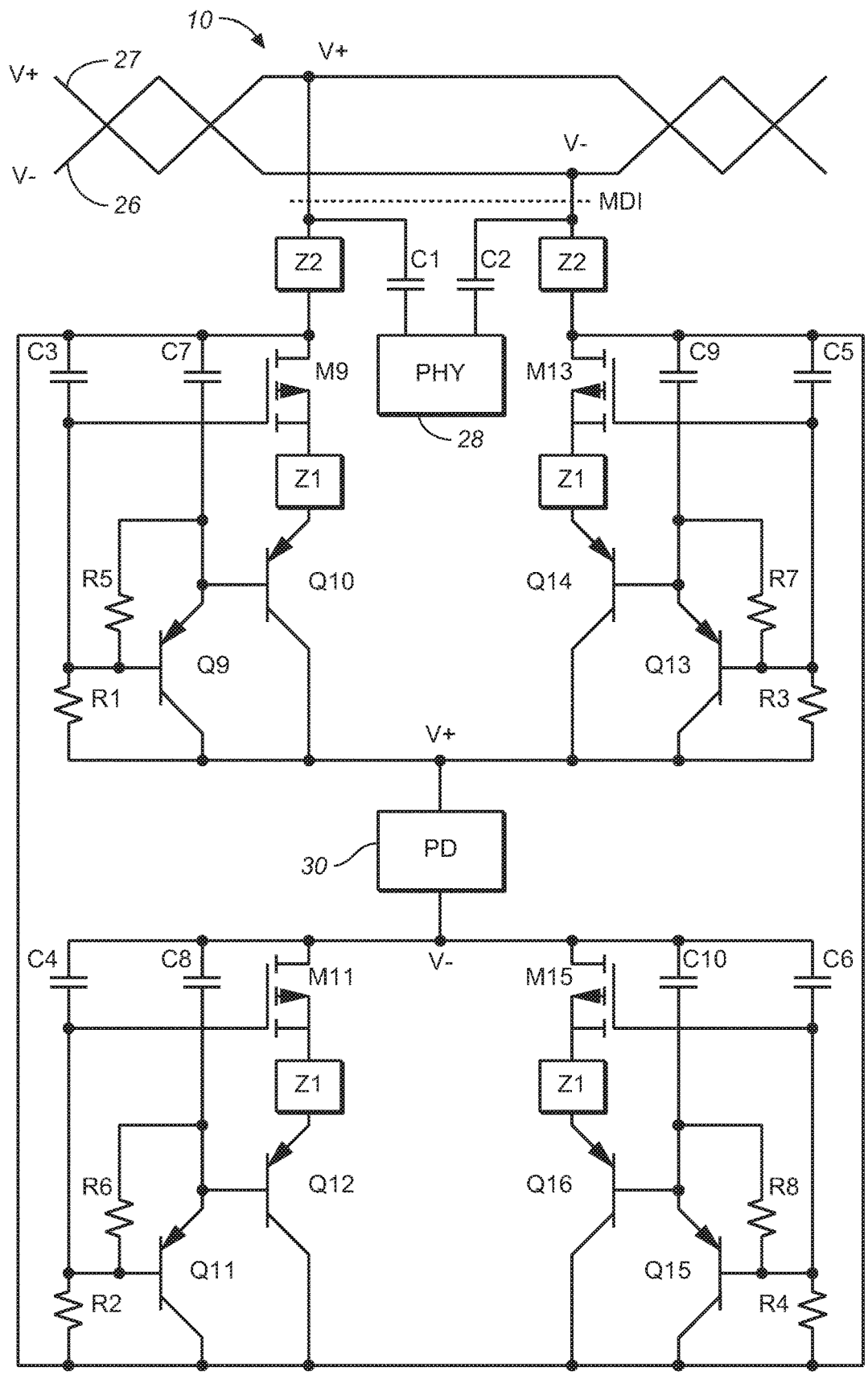
FIG. 10 illustrates how the full-bridge rectifier uses a combination of PNP bipolar transistors and P-channel MOSFETs.

FIG. 10 illustrates how the full-bridge rectifier uses a combination of PNP bipolar transistors and P-channel MOSFETs. FIG. 10 is the same as FIG. 9 except that the diodes D5-D8 are replaced with P-channel MOSFETs M9, M11, M13, and M15. With the DC polarity shown, the transistors Q9, Q10, and M9 are turned on to create a current path between the wire 27 and the top terminal of the PD load 30, and the transistors Q15, Q16, and M15 are turned on to create a current path between the wire 26 and the bottom terminal of the PD load 30.

Figure 11:
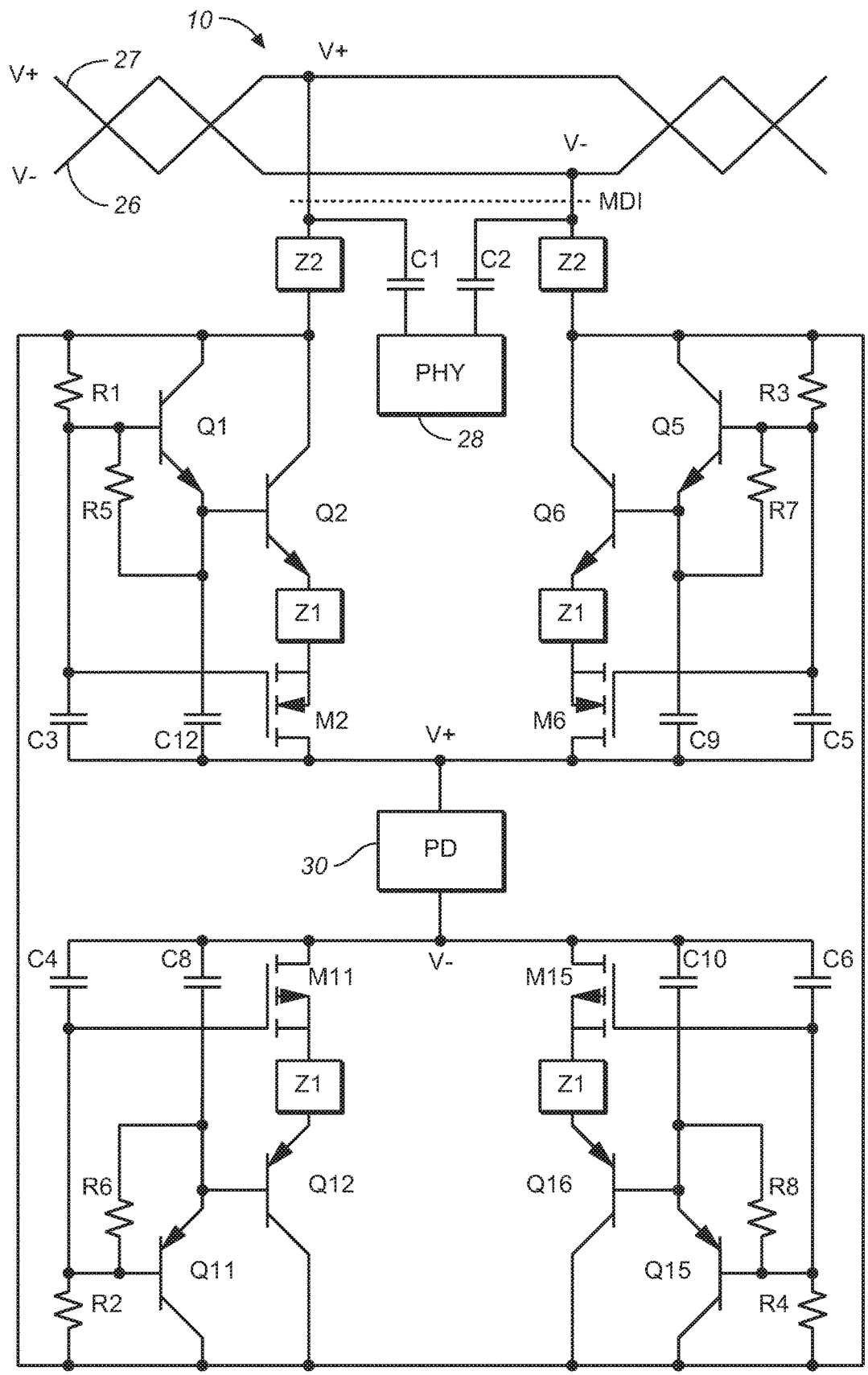
FIG. 11 illustrates how one full-bridge rectifier portion uses a combination of PNP bipolar transistors and P-channel MOSFETs, and the other full-bridge rectifier portion uses a combination of NPN bipolar transistors and N-channel MOSFETs.

FIG. 11 illustrates how one full-bridge rectifier portion uses a combination of PNP bipolar transistors and P-channel MOSFETs, and the other full-bridge rectifier portion uses a combination of NPN bipolar transistors and N-channel MOSFETs. The top half is the same as in FIG. 7, and the bottom half is the same as in FIG. 10.

Figure 12:
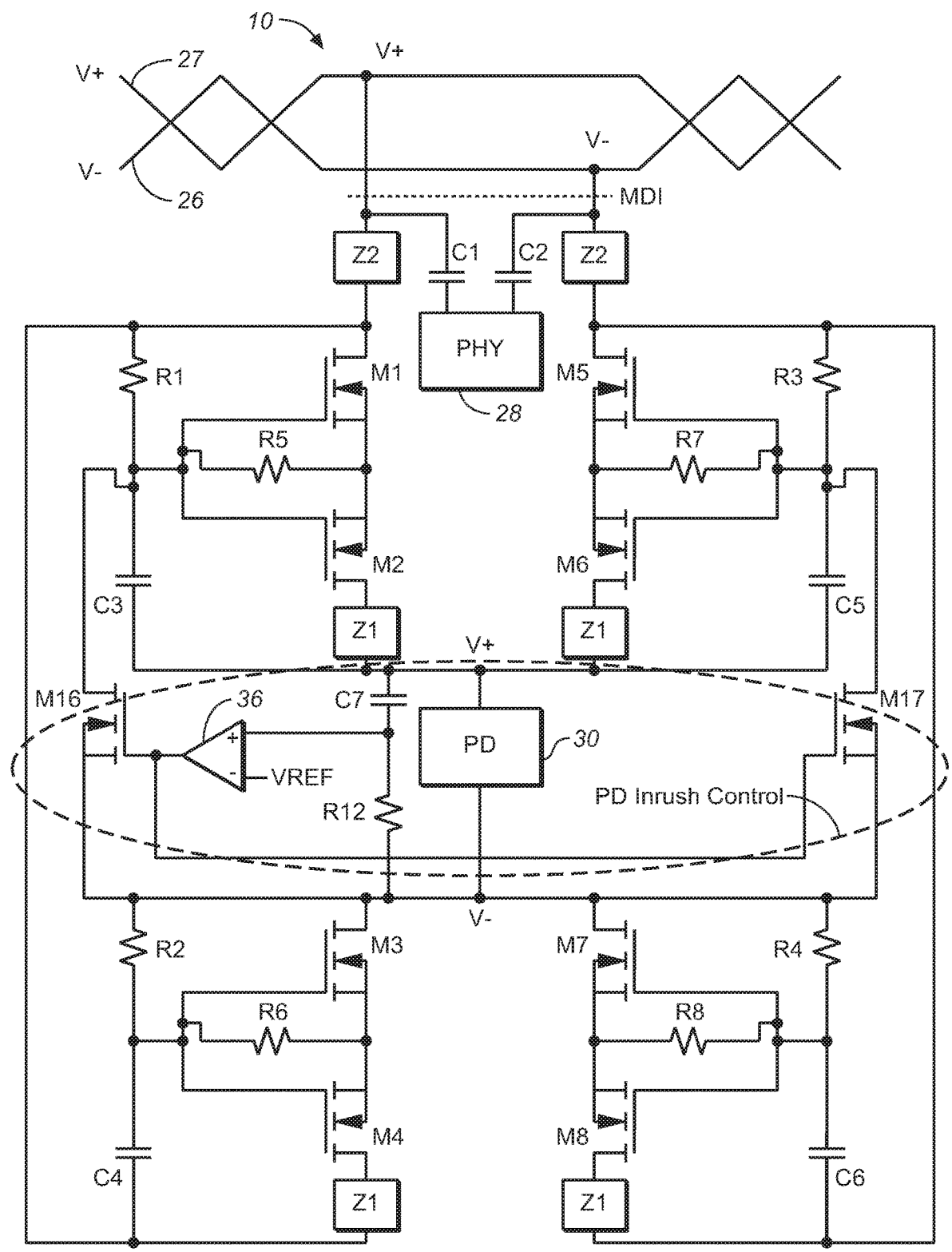
FIG. 12 is similar to FIG. 3 but adds a circuit for PD inrush current control.

FIG. 12 is similar to FIG. 3 but adds a circuit for PD inrush current control. When the PoDL system is first turned on or if there is an abrupt change in the PD load 30, there may be a large in-rush current due to capacitances charging. This may cause a high voltage slew rate across the PD load 30, which may cause damage. In FIG. 12, a voltage slew rate above a threshold causes a high enough current to flow through the resistor R12 to cause the voltage at the non-inverting input of the differential amplifier 36 to equal the reference voltage VREF. At this point, the amplifier 36 servos the gate-to-source voltage of the N-channel MOSFETs M16 and M17 sufficiently to cause the voltage at resistor R12 to remain at VREF during the in-rush time to limit the voltage slew across the PD load 30. By making the MOSFETs M16 and M17 conductive, some current is routed around the PD load 30 to limit the in-rush current into the PD load 30. Once, the in-rush period is over, the voltage at resistor R12 will remain below VREF, and the MOSFETs M16 and M17 will be off.

Figure 13:
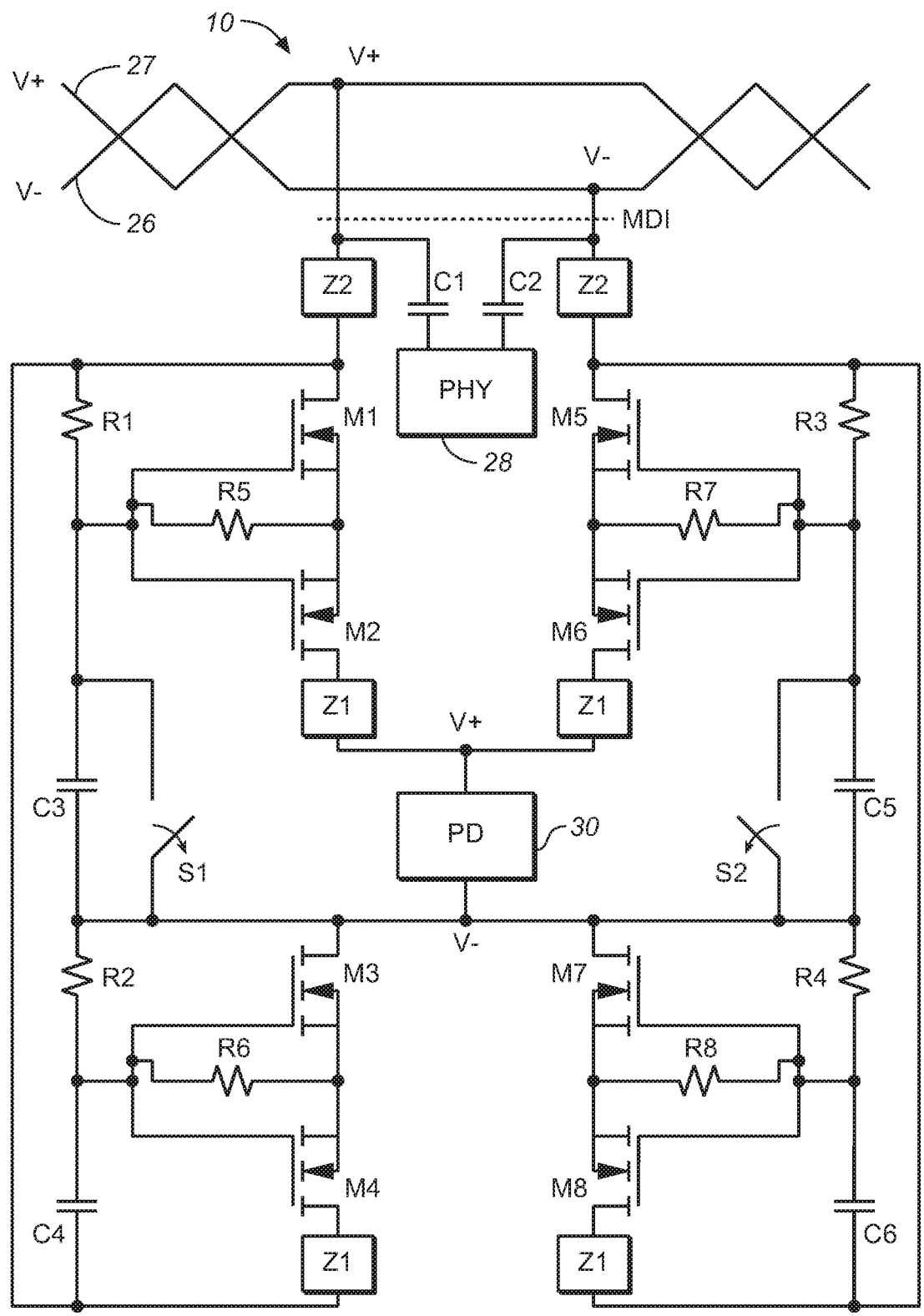
FIG. 13 is similar to FIG. 3 but has a different configuration for the capacitors and adds switches to control the application of DC voltage across the PD load terminals.

FIG. 13 is similar to FIG. 3 but adds switches to control the application of DC voltage across the PD load terminals. In FIG. 13, the capacitors C3 and C5 are connected to the bottom terminal of the PD load 30. The switches S1 and S2 may be MOSFETs which are initially held on when voltage is applied to the PD connector. After a delay interval, the switches S1 and S2 may be turned off, thus allowing the voltage at the intersection of R1/R5/C3 to charge to a final value with an exponential decay characteristic of an R-C low pass filter. The voltage across the PD load 30 will track this decay thus limiting the slew rate of the voltage.

In one embodiment, no PHY is included in the PD, and the PD is powered by the DC voltage on the wires. Other PDs coupled to the same wires may include PHYs and be powered by the same PSE.

Accordingly, various embodiments of gyrators have been described that perform a function of a DC-coupling inductor and full bridge rectifier for a PD coupled to a wire pair so that the PSE can provide a DC voltage on the wire pair of either polarity. The gyrator presents a high impedance to differential data signals so that a PD load does not significantly affect the data signals on the wire pair.

Any of the disclosed features may be combined for a particular application.

While particular embodiments of the present invention have been shown and described, it will be obvious to those skilled in the art that changes and modifications may be made without departing from this invention in its broader aspects and, therefore, the appended claims are to encompass within their scope all such changes and modifications that are within the true spirit and scope of this invention.

What is claimed is:

1. A circuit for a Power over Data Lines (PoDL) system, wherein the PoDL system provides a DC voltage and differential data signals on the same wire pair, the circuit comprising:
   a Powered Device (PD) load for being powered by the DC voltage on the wire pair; and
   a gyrator including:
   a first input terminal configured to be coupled to a first wire of the wire pair;
   a second input terminal configured to be coupled to a second wire of the wire pair;
   a first output terminal coupled to a first power supply terminal of the PD load,
   a second output terminal coupled to a second power supply terminal of the PD load, wherein the first output terminal outputs a first DC voltage more positive than a second DC voltage output by the second output terminal irrespective of a polarity of the DC voltage coupled across the wire pair;
   a first transistor coupled in series between the first input terminal of the gyrator and the first output terminal of the gyrator, the first transistor being a first MOSFET or a first bipolar transistor;
   a second transistor coupled in series between the second input terminal of the gyrator and the first output terminal of the gyrator, the second transistor being a second MOSFET or a second bipolar transistor,
   wherein either the first transistor or the second transistor is conductive during operation of the gyrator to couple the first DC voltage to the first power supply terminal of the PD load;
   a third transistor coupled in series between the first input terminal of the gyrator and the second output terminal of the gyrator, the third transistor being a third MOSFET or a third bipolar transistor; and
   a fourth transistor coupled in series between the second input terminal of the gyrator and the second output terminal of the gyrator, the fourth transistor being a fourth MOSFET or a fourth bipolar transistor,
   wherein either the third transistor or the fourth transistor is conductive during operation of the gyrator to couple the second DC voltage to the second power supply terminal of the PD load.

2. The circuit of claim 1 wherein a drain of the first MOSFET or a collector of the first bipolar transistor is coupled to the first input terminal of the gyrator.

3. The circuit of claim 2 wherein a drain of the second MOSFET or a collector of the second bipolar transistor is coupled to the second input terminal of the gyrator.

4. The circuit of claim 1 wherein a drain of the third MOSFET or a collector of the third bipolar transistor is coupled to the second output terminal of the gyrator.

5. The circuit of claim 4 wherein a drain of the fourth MOSFET or a collector of the fourth bipolar transistor is coupled to the second output terminal of the gyrator.

6. The circuit of claim 1 further comprising:
   a first capacitor coupled in series with a first resistor between the first input terminal and the first output terminal, a node between the first capacitor and the first resistor being coupled to a control terminal of the first transistor;
   a second resistor coupled between the control terminal of the first transistor and a source of the first MOSFET or an emitter of the first bipolar transistor;

a second capacitor coupled in series with a third resistor between the second input terminal and the first output terminal, a node between the second capacitor and the third resistor being coupled to a control terminal of the second transistor;

a fourth resistor coupled between the control terminal of the second transistor and a source of the second MOSFET or an emitter of the second bipolar transistor;

a third capacitor coupled in series with a fifth resistor between the first input terminal and the second output terminal, a node between the third capacitor and the fifth resistor being coupled to a control terminal of the third transistor;

a sixth resistor coupled between the control terminal of the third transistor and a source of the third MOSFET or an emitter of the third bipolar transistor; and a fourth capacitor coupled in series with a seventh resistor between the second input terminal and the second output terminal, a node between the fourth capacitor and the seventh resistor being coupled to a control terminal of the fourth transistor; and an eighth resistor coupled between the control terminal of the fourth transistor and a source of the fourth MOSFET or an emitter of the fourth bipolar transistor.

7. The circuit of claim 1 further comprising:
a fifth transistor in series with the first transistor;
a sixth transistor in series with the second transistor;
a seventh transistor in series with the third transistor; and
an eighth transistor in series with the fourth transistor.

8. The circuit of claim 1 wherein the first transistor, the second transistor, the third transistor, and the fourth transistor operate in saturation when conductive.

9. The circuit of claim 1 further comprising:
a first diode in series with the first transistor;
a second diode in series with the second transistor;
a third diode in series with the third transistor; and
a fourth diode in series with the fourth transistor.

10. The circuit of claim 1 wherein the first transistor, the second transistor, the third transistor, and the fourth transistor are each a bipolar transistor connected in a Darlington pair.

11. The circuit of claim 1 wherein the first transistor, the second transistor, the third transistor, and the fourth transistor operate in saturation when conductive, the circuit further comprising:
a fifth transistor in series with the first transistor;
a sixth transistor in series with the second transistor;
a seventh transistor in series with the third transistor; and
an eighth transistor in series with the fourth transistor, wherein the fifth transistor, the sixth transistor, the seventh transistor, and the eighth transistor operate in a triode region when conductive.

12. The circuit of claim 1 wherein the gyrator contains negative feedback circuits coupled to respective ones of the first transistor, the second transistor, the third transistor, and the fourth transistor for reducing fluctuations in current through the gyrator due to differential data signals on the wire pair.

13. A circuit for a Power over Data Lines (PoDL) system, wherein the PoDL system provides a DC voltage and differential data signals on the same wire pair, the circuit comprising:
a Powered Device (PD) load for being powered by the DC voltage on the wire pair; and
a gyrator comprising transistors and configured for being coupled between the wire pair and power supply terminals of the PD load, the gyrator emulating a DC-coupling function of an inductor and a full-bridge rectifier function for ensuring a correct polarity DC voltage is applied to the PD load, wherein the gyrator includes negative feedback circuits configured for reducing fluctuations in current through the gyrator due to differential data signals on the wire pair.

14. The circuit of claim 13, further comprising a transceiver coupled to the wire pair via AC-coupling capacitors.

15. The circuit of claim 13, further comprising Power Source Equipment (PSE) coupled to the wire pair for supplying the DC voltage to the wire pair.

16. The circuit of claim 13, wherein the gyrator presents a high impedance to differential signals on the wire pair.

17. A method performed by a Power over Data Lines (PoDL) system comprising:
providing a DC voltage and differential data signals on a single wire pair;
powering a Powered Device (PD) load, coupled to the wire pair via a gyrator, by the DC voltage on the wire pair;
performing DC voltage polarity correction by the gyrator;
filtering the differential data signals by the gyrator;
DC-coupling the correct polarity DC voltage to power supply terminals of the PD load; and
the gyrator performing negative feedback for differential data signals using negative feedback circuits of the gyrator, the negative feedback circuits configured for reducing fluctuations in current through the gyrator due to the differential data signals on the wire pair.

18. The method of claim 17 comprising the gyrator emulating a DC-coupling function of an inductor and a full-bridge rectifier function for ensuring a correct polarity DC voltage is applied to the PD load.

* * * * *